United States Patent [19]

Shenk

[11] Patent Number: 4,490,814
[45] Date of Patent: Dec. 25, 1984

[54] SONIC AUTOFOCUS CAMERA HAVING VARIABLE SONIC BEAMWIDTH

[75] Inventor: Edwin K. Shenk, Westford, Mass.

[73] Assignee: Polaroid Corporation, Cambridge, Mass.

[21] Appl. No.: 574,885

[22] Filed: Jan. 30, 1984

Related U.S. Application Data

[62] Division of Ser. No. 429,820, Sep. 30, 1982, Pat. No. 4,440,482.

[51] Int. Cl.³ .............................................. H04R 19/00
[52] U.S. Cl. ................................. 367/140; 179/111 R; 367/105
[58] Field of Search ...................... 179/111 R, 106; 367/105, 140

[56] References Cited

U.S. PATENT DOCUMENTS

| | | |
|---|---|---|
| 3,522,764 | 8/1970 | Biber ........................................ 95/44 |
| 4,081,626 | 3/1978 | Muggli et al. ...................... 179/111 R |
| 4,103,309 | 7/1978 | Massa ....................................... 354/25 |
| 4,199,246 | 4/1980 | Muggli ................................... 354/195 |
| 4,241,611 | 12/1980 | Specht et al. ........................ 367/105 |
| 4,242,913 | 1/1981 | Mezrich et al. ...................... 367/105 |

Primary Examiner—Richard A. Farley
Attorney, Agent, or Firm—John J. Kelleher

[57] ABSTRACT

A photographic camera having a plurality of interchangeable, adjustable focus lenses and having a focus control system capable of focusing each such lens over a range of subject distances in response to a rangefinder derived signal is provided with a sonic ranging system that includes an ultrasonic, capacitance-type transducer having a multiple segment backplate whose sonic beam angle is automatically correlated to the field-of-view angle of the image forming lens by selecting a particular combination of backplate segments when or as a particular interchangeable lens is attached to the camera body.

2 Claims, 7 Drawing Figures

SONIC AUTOFOCUS CAMERA HAVING VARIABLE SONIC BEAMWIDTH

This is a division of application Ser. No. 429,820 filed Sept. 30, 1982, now U.S. Pat. No. 4,440,482.

BACKGROUND OF THE INVENTION

The present invention relates to automatic focusing photographic cameras, in general, and to control systems for focusing alternatively employed interchangeable adjustable focus lens assemblies on such cameras, in particular.

Photographic cameras having interchangeable adjustable focus lenses are well known in the prior art. Cameras having an adjustable focus lens and having a focus control system coupled to said lens for automatically focusing image forming light rays from a remote subject at the film plane of such a camera in response to a range finder derived signal representative of the actual distance between said camera and said remote object, are also known in prior art. A camera having such a focus control system and utilizing acoustical energy to determine the distance to a remote object is described in U.S. Pat. No. 3,522,764 to BIBER et al. In said BIBER et al patent separate transmitting and receiving transducers are employed in the ranging systems disclosed therein to determine subject distance. In U.S. Pat. No. 4,081,626 to MUGGLI et al and in U.S. Pat. No. 4,199,246 to MUGGLI, a single transducer that both transmits a burst of sonic energy toward a subject and subsequently detects an echo of said energy reflected from said subject is employed for object distance determining or ranging purposes.

The lens of a camera, as well as other optical instruments, has a characteristic viewing angle associated therewith that spans the area that is visible through said lens and is generally referred to as the lens optical field-of-view angle. Similarly, a highly directional, object presence detecting transducer for use in a focus control system in an autofocusing camera such as the combination transmitting and receiving transducer described in certain of the abovecited patents, also has a characteristic transmitting angle associated therewith that spans the primary region within which the presence of objects can be detected and that angle is referred to herein as the transducer main lobe or acceptance angle.

When selecting the size of a transducer acceptance angle for compatibility with an automatically focused adjustable focus lens, normal practice is to select an angle that is substantially smaller than the field of view angle of said adjustable focus lens, said acceptance angle usually being in the neighborhood of 10% of the lens field-of-view angle. If the transducer acceptance angle was greater than the field of view angle of the adjustable focus lens that it helps to focus, a spurious object detection signal may be generated from objects located outside of the adjustable focus lens optical field-of-view and closer to said control system transducer than objects located within said optical field of view, which might result in a misfocused lens. This problem is avoided by selecting an object detecting capacitance-type transducer with a relatively narrow acceptance angle in accordance with the criteria mentioned above.

One disadvantage associated with the requirement that a transducer acceptance angle be in the neighborhood of 10% of the field-of-view angle of the lens that it helps to focus is that in a photographic camera of the type employing interchangeable adjustable focus lens assemblies with different optical field-of-view angles an acoustical transducer is required whose acceptance angle can readily be varied to meet the 10% criterion mentioned above. In the capacitance-type transducer described in the above cited MUGGLE patent, the transducer angle can only be changed by either changing transducer operating frequency or by changing the diameter of the backplate that forms a portion of said transducer. Changing the operating frequency will change the level or intensity of transmitted acoustical energy at any given distance from the transducer and would require more complex electrical circuitry to provide the object detecting means and the range of frequencies required for such an arrangement. To change the diameter of a backplate in a capacitance-type transducer previous practice would dictate substitution of one transducer with the appropriate acceptance angle for one that did not have the appropriate acceptance angle.

A primary object of the present invention is to provide a capacitance-type acoustical transducer having a variable acceptance angle.

Another object of the present invention is to provide a capacitance-type acoustical transducer whose effective backplate diameter can readily be changed by means external of said transducer.

A further object of the present invention is to provide an autofocus camera having a plurality of interchangeable, adjustable focus lenses with a focus control system having an object detecting acoustical transducer whose acceptance angle is automatically or manually changed to accommodate each such lens as or after it is attached to the camera body.

Other objects, features and advantages of the present invention will be readily apparent from the following detailed description of a preferred embodiment thereof taken in conjunction with the accompanying drawings.

SUMMARY OF THE INVENTION

In accordance with the teachings of the present invention a photographic camera having a plurality of interchangeable, adjustable focus lenses is provided with an automatic focus control system that includes a ranging system having an acoustical energy transmitting and receiving capacitance-type transducer whose main beam angle can be readily correlated to the field-of-view angle of an attached adjustable focus lens. The transducer includes a backplate having portions thereof subdivided into a plurality of electrically isolated segments. Means are provided for electrically interconnecting a particular combination of backplate segments to one another in order to correlate the transducer's main sonic beam angle to the field-of view angle of a particular interchangeable adjustable focus lens.

DESCRIPTION OF THE PREFERRED EMBODIMENTS

Figure 1:
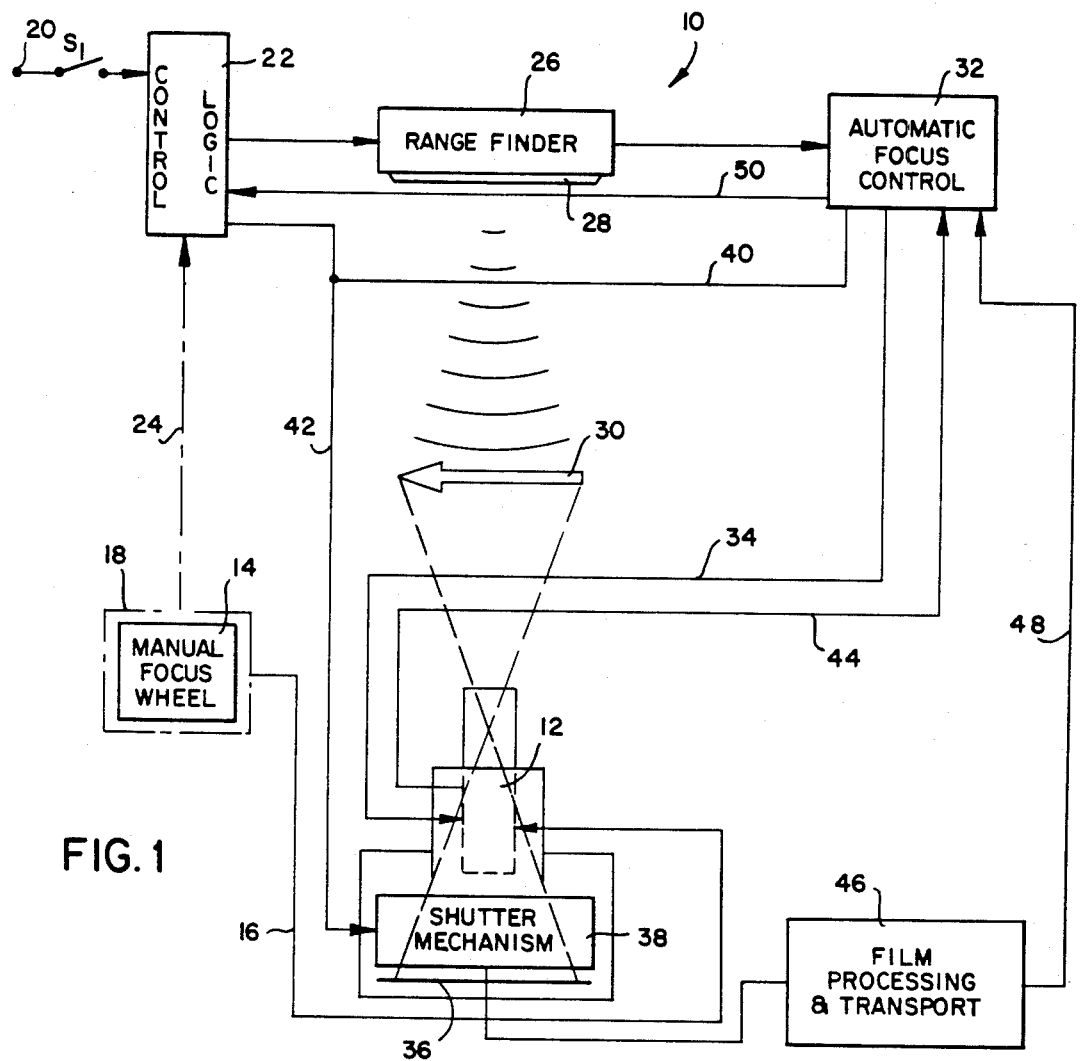
FIG. 1 is a functional block diagram of a manual/automatic focusing interchangeable lens camera incorporating the variable sonic beam-angle transducer of the present invention.

Referring now to the drawings, and specifically to FIG. 1, a schematic diagram of interchangeable adjustable focus lens camera 10 incorporating a preferred embodiment of the present invention, is depicted. Camera 10 has both manual and automatic focusing modes of operation. In the manual focus control mode adjustable focus lens 12 is manually focussed by focus wheel 14 that is mechanically coupled to said lens 12 through path 16. In the automatic focus control mode lens 12 focusing movement is controlled by an acoustical rangefinder derived signal. Focus wheel 14 movement occurs whenever lens 12 is focused and therefore protective barrier 18 is provided to limit physical access to focus wheel 14 in order to prevent interference with automatic lens focussing as the lens moves in response to said rangefinder derived signal. Camera 10 focussing modes are determined by the position of displaceable barrier 18. Camera 10 is placed in its manual focus control mode when barrier 18 is fully displaced to permit manual access to focus wheel 14. Conversely, camera 10 is placed in its automatic focus control mode when said barrier 18 is placed in its protective position where it limits physical access to focus wheel 14.

As mentioned above, in order to operate camera 10 in its automatic focus control mode displaceable barrier 18 is positioned to its protective position where it limits physical access to manual focus wheel 14. An automatically focussed picture taking sequence is initiated by actuating switch $S_1$ to its closed position after the automatic focus control system has been selected by the appropriate displaceable barrier 18 movement. A voltage source (not shown) is connected to terminal 20 and is, in turn, connected to one terminal of said switch $S_1$. When conventional control logic circuitry 22 determines that protective barrier 18 is in its protective or autofocus mode position by monitoring the position of said barrier 18 through path 24, and manually actuated switch $S_1$ applies the voltage source of terminal 20 to control logic circuitry 22, said control logic circuitry 22 transmits a signal to rangefinder 26 causing said rangefinder 26 and capacitance-type acoustical transducer 28 included therein to transmit a distance determining burst of ultrasonic energy toward subject 30 for the purpose of determining the distance between said subject 30 and camera 10. When the distance to subject 30 has been determined, rangefinder 26 causes automatic focus control 32 to transmit a lens movement or focusing force to variable focus lens 12 through path 34 causing said lens 12 to form an in-focus image of subject 30 at film plane 36 of camera 10 when shutter mechanism 38 is actuated to its open position by a shutter actuation signal from automatic focus control 32 through paths 40 and 42. When lens 12 reaches the desired focus position, a signal is sent back to automatic focus control 32 through path 44 causing said automatic focus control 32 to terminate lens focusing movement. Camera 10 is of the instant or self-processing type and therefore once the actuation of shutter mechanism 36 is complete, film processing and transport cycle 46 is initiated. When film processing and transport cycle 46 is complete, a signal is sent to automatic focus control 32 through path 48 and to control logic circuitry 22 through path 50 to re-initialize the automatic focus control system.

Figure 2A:
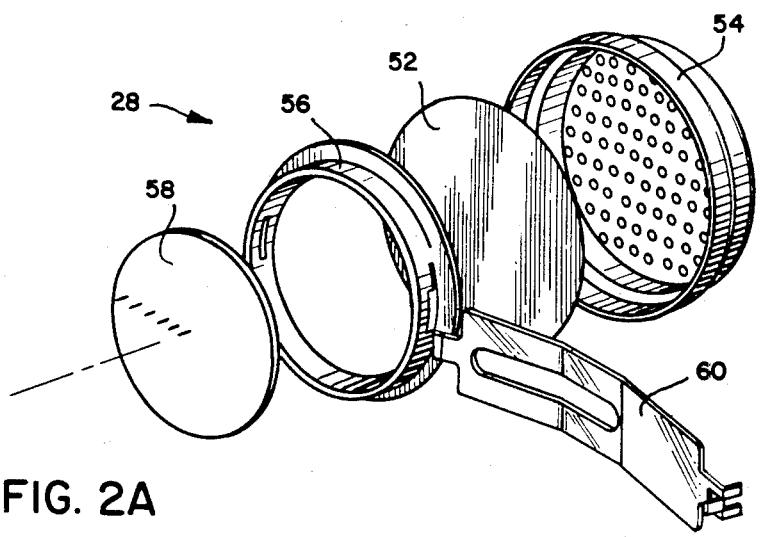
FIG. 2A is an exploded perspective view of a capacitance-type acoustical transducer employed in the interchangeable lens camera of FIG. 1.

Capacitance-type acoustical transducers such as transducer 28 in FIG. 1 are well known in the prior art. An exploded perspective view of said transducer 28 is shown in drawing FIG. 2A. With reference to FIG. 2A, in transducer 28 diaphragm 52 having an insulative layer and an electrically conductive layer has its periphery sandwiched between electrically conductive housing 54 and support ring 56 with its insulative layer in contact with the grooved electrically conductive surface of backplate 58 and with the conductive layer in contact with housing 54 when said transducer 28 is fully assembled. In this sandwiched position the periphery of diaphragm 52 is maintained in a fixed position with respect to transducer housing 54 and support ring 56, while a force from leaf spring 60 urges the grooved surface of backplate 58 into diaphragm tensioning engagement with the insulative layer of diaphragm 52. The construction of transducer 28 is shown in much greater detail in U.S. Pat. No. 4,085,297 to PAGLIA which is specifically incorporated herein by reference.

The insulative and electrically conductive layers of diaphragm 52 and the conductive grooved surface of said backplate 58 form a capacitor such that when a dc bias voltage is applied across the electrodes of said capacitor 28, irregularities on the grooved surface of backplate 58 set up localized concentrated electric fields in said insulative layer. When an ac signal is superimposed on said dc bias voltage, the insulative layer is stressed such that oscillatory formations develop causing an acoustical wave front to be propagated from the diaphragm. A received acoustical wave front impinging on the insulative layer produces a variable voltage across the transducer or capacitor electrodes.

Figure 2B:
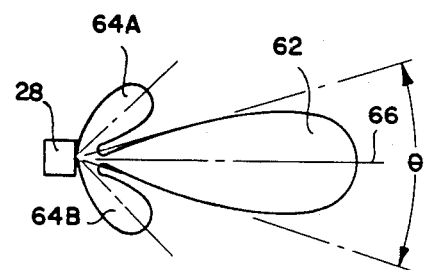
FIG. 2B is the beam or lobe pattern of the capacitance-type transducer depicted in FIG. 2A showing acoustical energy transmission as a function of the angle from the principal or main lobe axis of said transducer.

When energized, transducer 28 transmits a directional, multiple-lobe pattern of ultrasonic object-detecting energy such as that shown in drawing FIG. 2B, the envelope or contours of which are fairly well understood in the art. As shown in FIG. 2B, a multiple-lobe transducer pattern of a transducer with a circular backplate of 3.5 cm in diameter consists of a single central lobe 62 having a lobe angle $\theta$ (normally conical) of approximately 12° at its half power point ($-3$ dB) when operated at a frequency of 50 KHz, and a plurality of substantially smaller side lobes 64A, 64B, etc., with all of said lobes being generally symmetrical about main or central axis of transmission 66 of said transducer 28. Conical main lobe angle $\theta$ may be changed by either changing transducer operating frequency or by changing backplate diameter. This capacitance-type transducer multiple-lobe pattern is described in much greater detail in U.S. Pat. No. 4,199,246 issued Apr. 22, 1980 to J. MUGGLI and in an article by W. KUHL et al. entitled "Condenser Transmitters and Microphones with Solid Dielectric for Airborne Ultrasonics" in *Acoustica*, Vol. IV, 1954, pp. 519-532.

Figure 3:
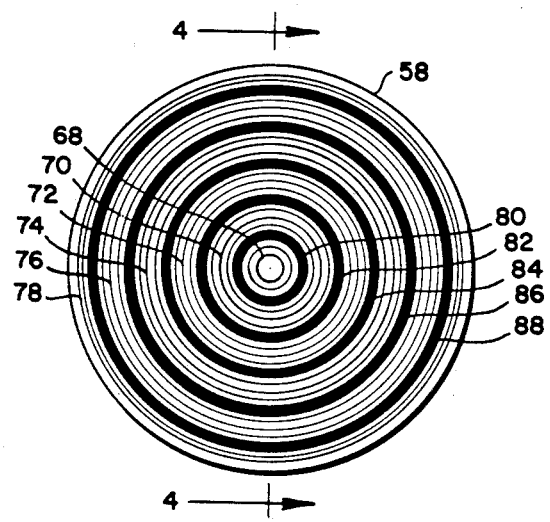
FIG. 3 is an enlarged top or grooved surface view of the backplate member of the capacitance-type transducer shown in drawing FIG. 2.
Figure 4:
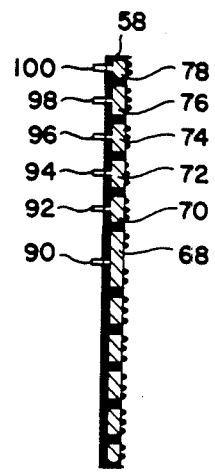
FIG. 4 is a sectional view taken along the line 4—4 in FIG. 3.

As stated above, transducer lobe angle θ, shown in drawing FIG. 2B, can be changed by either changing transducer operating frequency or by changing backplate grooved surface area. In accordance with a preferred embodiment of the present invention, transducer 28 shown in drawing FIGS. 1 and 2A includes circular backplate 58 whose effective diameter and therefore grooved surface area can be readily changed to correlate transducer acceptance angle with lens field-of-view angle in accordance with the acceptance angle to field-of-view angle relationship mentioned above. An enlarged grooved-surface view and a sectional side view of backplate 58 are shown in drawing FIGS. 3 and 4, respectively. As shown in FIG. 3, circular backplate 58 includes a surface having a plurality of conventional circular grooves whose function is described above in detail. This grooved surface is subdivided into an inner conductive circular portion 68 and a plurality of outer conductive ring portions 70, 72, 74, 76 and 78 that are electrically isolated from one another by insulative ring portions 80, 82, 84, 86 and 88, respectively. The size of the insulative ring portions of backplate 58 have been exaggerated with respect to the actual and relative size of the conductive ring portions of said backplate 58 in order to facilitate backplate description. In addition, in FIG. 4, which is a sectional view taken along the line 4—4 in FIG. 3, each electrically conductive backplate portion 68, 70, 72, 74, 76 and 78 has its own electrically conductive pin 90, 92, 94, 96, 98 and 100, respectively, projecting therefrom to provide an electrical connection from said electrically conductive backplate portions to circuitry external of transducer 28.

Figure 5A:
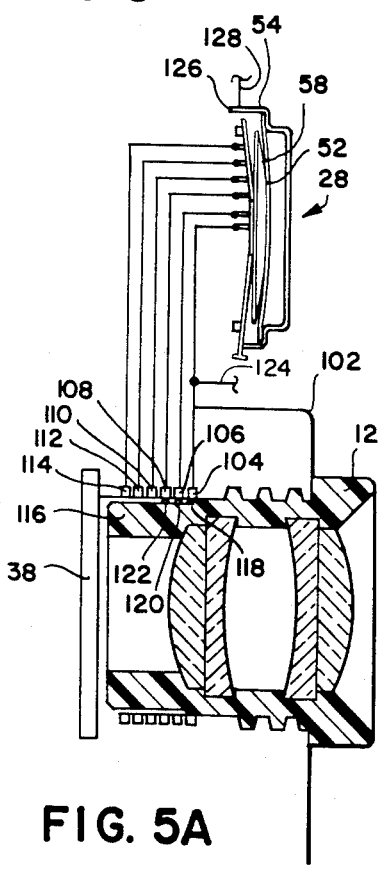
FIG. 5A is a schematic diagram, partially in section, of a portion of the camera of FIG. 1 showing a particular lens assembly being attached to the camera body and means for correlating the diameter of the transducer backplate member to the field-of-view of the attached lens assembly.

Turning to FIG. 5A, transducer 28, incorporating the above-described multi-segment or multi-ring backplate of the present invention is mounted on camera body 102 of manual/automatic focusing camera 10 (FIG. 1). Pins 90, 92, 94, 96, 98 and 100 projecting from multiple-ring backplate 58 are electrically connected to contact terminals 104, 106, 108, 110, 112 and 114, respectively, said terminals being fixedly attached to camera body 102. Interchangeable adjustable focus lens 12 includes cylindrical portion 116 on which are mounted three electrically interconnected spring-loaded conductive contacts 118, 120 and 122. When lens 12 is fully seated in body 102 of camera 10, backplate segments and/or rings 68, 70 and 72 (FIG. 3) are electrically connected to one another through said electrically interconnected spring-loaded contacts 118, 120 and 122. When lens 12 is so placed in camera body 102, the effective diameter and grooved surface area of backplate 58 extends to the periphery of backplate ring or portion 72 because outer rings 74, 76 and 78 are, in this particular instance, electrically isolated from the now interconnected inner backplate rings or portions. The number of spring-loaded contacts mounted on the cylindrical portion of an adjustable focus lens such as cylindrical portion 116 of lens 12 is determined by the desired relationship between the field-of-view angle of an interchangeable adjustable focus lens and the acceptance angle of the capacitance-type transducer such as transducer 28. The correlation of lens fidld-of-view angle to transducer acceptance or conical angle is finally determined by the number of electrical contacts mounted on the cylindrical portion of the attached adjustable focus lens that interconnects predetermined portions of backplate 58, a number that could be a single segment or anywhere up to the maximum number of segments or portions forming a multiple-segment transducer backplate. It should be noted that with the exception of pin 90 the above-mentioned pins projecting from backplate 58 (FIG. 4) are for interconnecting backplate segments only. Electrical signals from rangefinder 26 (FIG. 1) that cause transducer 28 to transmit a burst of acoustical energy toward an object are applied to said pin 90 through path 124 and to terminal 126 of conductive transducer housing 54 through path 128, said housing being in electrical contact with the electrically conductive layer of transducer diaphragm 52, as mentioned above, when transducer 26 is fully assembled.

Figure 5B:
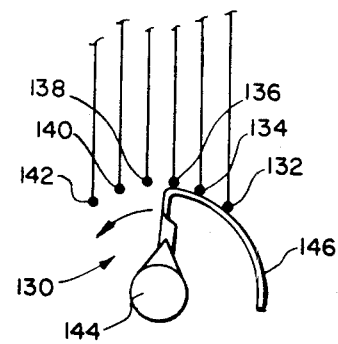
FIG. 5B is an enlarged detail of a portion of the manually actuated, backplate segment interconnecting switch means of the present invention.

In this preferred embodiment of applicant's inventive concept backplate segments are electrically interconnected to one another when the lens assembly is fully seated on the camera body. Alternate through less desirable means for interconnecting backplate segments might include manually actuated switching means for electrically interconnecting backplate segments that would be actuated by a camera operator either before or after a lens assembly has been attached to the camera body. As shown in FIG. 5B, for example, manually actuated camera body mounted switch 130 includes a plurality of terminals 132, 134, 136, 138, 140 and 142 that could be electrically connected to transducer pins (FIG. 4) 90, 92, 94, 96, 98 and 100, respectively. A camera operator would merely rotate knob 144 such that shorting bar 146, which is mechanically coupled to said knob 144, interconnects the desired number of backplate segments.

It should also be noted that whereas backplate 58 is described in the preferred embodiment as comprising an electrically isolated circular inner portion and a plurality of electrically isolated outer rings or portions these particular shapes are not the primary feature of applicant's inventive concept. A backplate could have any number of different overall regular or irregular shapes in order to provide the acoustical energy transmission pattern desired. The essence of applicant's inventive concept is the altering of the acoustical energy transmission pattern by changing the effective backplate area by means of the electrical interconnection of selected segments or portions of a segmented backplate to correlate lens field-of-view angle to transducer transmission pattern or acceptance angle.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. A capacitance-type combination transmitting and receiving ultrasonic transducer comprising a diaphragm, a backplate having a grooved surface for cooperative engagement with said diaphragm, and means for coupling a source of voltage to said diaphragm and said backplate, said grooved surface backplate having a plurality of electrically isolated segments, and said coupling means including means for selectively interconnecting said segments to vary the effective diameter of said backplate to provide a given sonic beam angle in accordance therewith.

2. The transducer of claim 1 wherein said backplate comprises a plurality of insulatively joined concentric rings of conductive material, and said coupling means includes means for independently coupling each of said rings together whereby the beam angle of said transducer is varied in accordance with the largest ring selected for coupling to other of said rings.

* * * * *